United States Patent
Bevan et al.

(10) Patent No.: US 9,976,459 B2
(45) Date of Patent: May 22, 2018

(54) REGENERATION OF DIESEL PARTICLE FILTER

(71) Applicant: Jaguar Land Rover Limited

(72) Inventors: Neil Bevan, Warwickshire (GB); Nicholas Rawlinson, Leamington Spa (GB); Peter Koster, Nr. Banbury (GB); David Weatherall, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 304 days.

(21) Appl. No.: 14/385,117

(22) PCT Filed: Mar. 12, 2013

(86) PCT No.: PCT/EP2013/055025
§ 371 (c)(1),
(2) Date: Sep. 12, 2014

(87) PCT Pub. No.: WO2013/135717
PCT Pub. Date: Sep. 19, 2013

(65) Prior Publication Data
US 2015/0033943 A1 Feb. 5, 2015

(30) Foreign Application Priority Data

Mar. 13, 2012 (GB) .................................. 1204419.4

(51) Int. Cl.
*B01D 46/46* (2006.01)
*B01D 53/30* (2006.01)
*F01N 3/023* (2006.01)
*F02D 41/02* (2006.01)
*F02D 41/14* (2006.01)
*F01N 9/00* (2006.01)
*F01N 3/025* (2006.01)
*F01N 3/035* (2006.01)
*F01N 11/00* (2006.01)

(52) U.S. Cl.
CPC ........... *F01N 3/0231* (2013.01); *F01N 3/023* (2013.01); *F01N 3/025* (2013.01); *F01N 3/0253* (2013.01); *F01N 3/035* (2013.01); *F01N 9/002* (2013.01); *F01N 11/002* (2013.01); *F02D 41/029* (2013.01); *F02D 41/0225* (2013.01); *F02D 41/1466* (2013.01); *F01N 2260/04* (2013.01); *F01N 2430/00* (2013.01); *F01N 2430/08* (2013.01); *F01N 2550/04* (2013.01); *F01N 2900/0412* (2013.01); *F01N 2900/0601* (2013.01); *F01N 2900/08* (2013.01); *F01N 2900/1404* (2013.01); *F01N 2900/1606* (2013.01); *F02D 2200/0812* (2013.01); *F02D 2200/501* (2013.01); *F02D 2200/604* (2013.01); *Y02T 10/47* (2013.01)

(58) Field of Classification Search
CPC ........ F01N 3/0231; F01N 3/023; F01N 3/025; F01N 3/0253; F01N 3/035; F01N 9/002; F01N 11/002; F01N 2260/04; F01N 2430/00; F01N 2430/08; F01N 2550/04; F01N 2900/0412; F01N 2900/0601; F01N 2900/1404; F01N 2900/1606; F02D 41/0225; F02D 41/029; F02D 41/1466; F02D 2200/0812; F02D 2200/501; F02D 2200/604; Y02T 10/47
See application file for complete search history.

(56) References Cited

U.S. PATENT DOCUMENTS

| | | | |
|---|---|---|---|
| 4,215,593 A * | 8/1980 | Shono | B60K 17/3462 475/204 |
| 2003/0200016 A1* | 10/2003 | Spillane | B60G 17/0195 701/36 |
| 2008/0134669 A1 | 6/2008 | Lange | |
| 2009/0266050 A1 | 10/2009 | Dubray-Demol et al. | |
| 2009/0272103 A1* | 11/2009 | Danby | B01D 53/92 60/286 |
| 2010/0021356 A1* | 1/2010 | Blackwell | B01D 53/88 422/180 |
| 2010/0043403 A1* | 2/2010 | Minamikawa | B01D 46/0061 60/285 |
| 2011/0023468 A1 | 2/2011 | Yamada et al. | |
| 2011/0072787 A1* | 3/2011 | Hubbard | F01N 3/0253 60/276 |
| 2011/0088374 A1 | 4/2011 | Johnson | |
| 2011/0146246 A1 | 6/2011 | Farman | |
| 2011/0196584 A1* | 8/2011 | Fox | F16H 61/0202 701/51 |
| 2011/0213542 A1 | 9/2011 | Chazal | |
| 2011/0219752 A1 | 9/2011 | Gonze et al. | |
| 2012/0031072 A1 | 2/2012 | Gonze et al. | |
| 2012/0233985 A1* | 9/2012 | Chen | B01D 53/9454 60/274 |
| 2013/0040779 A1* | 2/2013 | Schneider | B60W 10/02 477/83 |
| 2013/0111877 A1* | 5/2013 | Larose, Jr. | F01N 3/103 60/274 |

(Continued)

FOREIGN PATENT DOCUMENTS

EP 1439294 7/2004
EP 2314851 10/2010
(Continued)

OTHER PUBLICATIONS

Zhang et al. U.S. Appl. No. 61/601,923 Specification, Electric Heating Assisted Passive and Active Regeneration for Efficient Emission contgrols of Diesel Engines, Feb. 22, 2012.*
(Continued)

*Primary Examiner* — Amber R Orlando
(74) *Attorney, Agent, or Firm* — Reising Ethington P.C.

(57) ABSTRACT

Regeneration of a diesel particle filter of an internal combustion engine of a vehicle is controlled according to soot mass loading and the vehicle operating condition. Regeneration modes include active regeneration and forced passive regeneration, and operating conditions include highway, town and off-road driving. One strategy may determine initiation of regeneration, and another may determine cessation. Regeneration mode may change in real time.

17 Claims, 2 Drawing Sheets

(56) References Cited

U.S. PATENT DOCUMENTS

| | | | | |
|---|---|---|---|---|
| 2013/0152550 A1* | 6/2013 | Karlsson | ................ | F01N 3/103 |
| | | | | 60/274 |
| 2013/0213010 A1* | 8/2013 | Zhang | ................... | F01N 3/2013 |
| | | | | 60/274 |
| 2013/0298771 A1* | 11/2013 | Albrecht | ............... | F01N 11/002 |
| | | | | 95/279 |
| 2014/0156126 A1* | 6/2014 | Tran | ................... | B60G 17/0165 |
| | | | | 701/22 |
| 2015/0046071 A1* | 2/2015 | Clarke | ............ | B60W 30/18018 |
| | | | | 701/112 |

FOREIGN PATENT DOCUMENTS

| | | | |
|---|---|---|---|
| FR | 2914692 | | 10/2008 |
| WO | WO2007103801 | | 9/2007 |
| WO | WO2009123633 | | 10/2009 |
| WO | WO2012080429 | * | 6/2012 |

OTHER PUBLICATIONS

International Search Report for application No. PCT/EP2013/055025, dated Jun. 28, 2013, 4 pages.
Great Britain Combined Search and Examination Report for application No. GB1204419.4, dated Jul. 16, 2012, 8 pages.

* cited by examiner

| Soot Mass % | < $T_{min}$ | ON ROAD | | OFF ROAD | |
|---|---|---|---|---|---|
| | | TOWN | HIGHWAY | ≤ $V_{min}$ | > $V_{max}$ |
| 0 | - | - | - | - | - |
| 10 | - | - | - | - | - |
| 20 | - | - | - | - | - |
| 50 | - | - | - | - | - |
| 75 | - | - | A | - | A |
| 100 | - | P | A | P | A |
| 125 | - | P | P | P | P |
| 150 | - | P | P | P | P |
| 200 | - | P | P | P | P |
| 210 | - | - | - | - | - |

| Soot Mass % | < $T_{min}$ | ON ROAD | | OFF ROAD | |
|---|---|---|---|---|---|
| | | TOWN | HIGHWAY | ≤ $V_{min}$ | > $V_{max}$ |
| 0 | - | - | - | - | - |
| 10 | P | P | A | - | - |
| 20 | P | P | A | - | - |
| 50 | P | P | A | P | A |
| 75 | P | P | A | P | A |
| 100 | P | P | A | P | A |
| 125 | P | P | P | P | A |
| 150 | P | P | P | P | A |
| 200 | P | P | P | P | P |
| 210 | - | - | - | - | - |

Fig. 3

REGENERATION OF DIESEL PARTICLE FILTER

FIELD

The present invention relates to regeneration of a diesel particle filter, and in particular to selection of a regeneration regime appropriate to an operating condition of a vehicle.

BACKGROUND OF THE INVENTION

Emissions legislation has resulted in the fitting of exhaust gas aftertreatment systems, in particular the fitting of a diesel particle filter (DPF) to the exhaust system of many diesel engined motor vehicles. Such filters trap small carbonaceous particles of an exhaust gas stream, to prevent emission to atmosphere. Over time, such filters become progressively more loaded so that the soot mass increases towards a design maximum, and regeneration is required.

Regeneration is accomplished by oxidizing the soot mass. Active regeneration requires the exhaust gas temperature at the inlet of the DPF to be raised to about 600° C., and this is generally accomplished by introducing unburned fuel into the engine after normal combustion (so called post-injection). The unburned fuel is combusted in the usual catalytic converter, and thereby raises the temperature of the exhaust gas so that regeneration of the DPF can occur spontaneously. Active regeneration is initiated by appropriate management of engine fuelling.

Passive regeneration may occur spontaneously if the exhaust stream has a high nitrogen dioxide flux, for example when an engine has a high $NO_x$ exhaust. Such passive regeneration occurs at a lower exhaust gas temperature, of about 400° C.

An active regeneration may take around 10 minutes, and a passive regeneration about 30 minutes. It will be understood however that the regeneration time is influenced by the volume of the DPF, the soot mass contained therein, exhaust gas conditions and other relevant factors, so that the times quoted are merely illustrative.

In order to minimize post-injection of fuel, which has the disadvantages of increasing fuel consumption and contaminating engine lubricant, active regeneration is most desirable in highway driving where engine speed is high and exhaust gas temperature may also be assumed to be high. In off-road driving or town driving, some regeneration strategies may not successfully complete regeneration because exhaust gas temperature at the DPF remains below a threshold, and accordingly the DPF may become blocked over an extended period of this kind of driving.

Passive regeneration could allow regeneration at lower temperatures, but typically requires forcing the vehicle engine to operate with a high $NO_x$ output, which is undesirable because of the inevitable increase in noxious emissions, or by providing a separate source of $NO_2$, which is generally impractical.

It is against this background that the present invention has been conceived. Embodiments of the invention may provide a method or a vehicle which adopts a regeneration strategy that can best provide appropriate regeneration in a range of vehicle operating conditions. Other aims and advantages of the invention will become apparent from the following description, claims and drawings.

SUMMARY OF THE INVENTION

According to one aspect of the invention there is provided a method of determining in a vehicle whether to regenerate a diesel particle filter by active regeneration or by forced passive regeneration, the method comprising the steps of substantially continually: determining a current soot mass of a diesel particle filter; determining at least one of a vehicle speed, an engine speed, a characteristic of the vehicle exhaust, a temperature of an engine or a temperature of an exhaust system; determining, in addition, an operating condition of the vehicle; determining whether the current soot mass of the diesel particle filter is in a permissible regeneration range indicated by the determined operating condition, and if in said range, initiating one of active regeneration and forced passive regeneration of the diesel particle filter.

According to a further aspect of the invention, there is provided a method of determining in a vehicle whether to regenerate a diesel particle filter by active regeneration or by forced passive regeneration, the method comprising:
determining a current soot mass of a diesel particle filter;
determining at least one of a vehicle speed, an engine speed, a characteristic of the vehicle exhaust, a temperature of an engine or a temperature of an exhaust system,
determining, in addition, an operating condition of the vehicle;
determining whether the current soot mass of the diesel particle filter is in a permissible regeneration range indicated by the determined operating condition,
and if within said range, initiating one of active regeneration and forced passive regeneration of the diesel particle filter.

According to a still further aspect of the invention there is provided a method of determining in a vehicle whether to cease regeneration of a diesel particle filter, the method comprising:
determining a current soot mass of a diesel particle filter;
determining at least one of a vehicle speed, an engine speed, a characteristic of the vehicle exhaust, a temperature of an engine or a temperature of an exhaust system,
determining, in addition, a current operating condition of the vehicle;
determining whether the current soot mass of the diesel particle filter is within a permissible regeneration range indicated by the determined operating condition;
and ceasing regeneration if outside said range.

A method according to the invention may further comprise determining whether the current soot mass is in a permissible regeneration range indicated by at least one of a vehicle speed, an engine speed, a characteristic of the vehicle exhaust, a temperature of an engine or a temperature of an exhaust system. The method may then further comprise if in said range, initiating one of active regeneration and forced passive regeneration of the diesel particle filter. Alternatively, the method may comprise ceasing regeneration. if outside said range.

The operating condition of the vehicle may be a vehicle configuration. The operating condition of the vehicle may be adapted to a mode of use. The operating conditions may include operating conditions suitable for use in on-road driving, off-road driving, wading, not wading, towing or not towing. The operating conditions may include the selection of a low transmission range, or a high transmission range.

The range of initiation of regeneration in one embodiment is 20-100% of maximum soot mass.

By forced passive regeneration we mean controlling the vehicle engine in a manner which will produce an exhaust gas composition and temperature which will initiate regeneration in a high nitrogen dioxide flux.

The method of embodiments of the invention provides for regeneration according to the vehicle operating condition, which can be determined from detection of certain vehicle operating parameters. Thus highway driving may for example be indicated by prolonged driving at greater than 60 kph. Off-road driving may be indicated for example by selection of a vehicle operating program appropriate for off-road use, or by selection of a low transmission range, or by detection of repeated large suspension movements. Town driving may be indicated for example by prolonged driving at less than 60 kph without the detection of off-road indicators.

The parameters for detection of each operating condition will be selected by the skilled man according to the particular vehicle and circumstances of expected use—in particular the period over which a condition is detected, having regard to the current soot mass of the DPF, and the anticipated regeneration time.

Dependent upon the detected operating condition, one of active regeneration, forced passive regeneration, and no regeneration may be preferred. A decision matrix may be provided in a look-up table of an electronic engine control unit, or some other means such as an algorithm may be used to indicate the desired regeneration strategy.

Thus, for example, should a diesel particle filter approach a soot mass threshold, and an operating condition of a vehicle tend toward an exhaust stream suitable for one kind of regeneration, the combustion conditions of the engine may be controlled to initiate that kind of regeneration.

The invention allows regeneration to be commenced with least modification of engine fuelling—in particular active regeneration is avoided when forced passive regeneration is indicated by conditions of vehicle use.

Regeneration may be inhibited during a cold start, that is to say until the vehicle engine has reached normal operating temperature, as indicated for example by the temperature of coolant of the vehicle engine, or by a temperature of the exhaust gas aftertreatment system(s).

In one embodiment the predetermined threshold may be different for active and forced passive regeneration thresholds. Thus the soot mass may be allowed to more closely approach a maximum should the operating conditions of the vehicle be unfavourable for a particular regeneration regime.

Regeneration may for example be postponed if the vehicle is in an operating mode which is not conducive to producing an exhaust stream which has a desired gas concentration. Such postponement may be in anticipation that the conditions of vehicle use will change to permit opportunistic regeneration in an exhaust stream which has a desired gas concentration.

This aspect of the invention allows for regeneration without forcing a vehicle engine to adopt an operating map designed to produce an exhaust stream appropriate to regeneration. Instead, regeneration is postponed until the vehicle engine is producing an appropriate exhaust stream. In particular regeneration in a nitrogen dioxide rich exhaust stream is best selected when the vehicle engine is in a low speed, high torque mode—when $NO_x$ content tends to be higher.

In one embodiment of the invention regeneration may be postponed if the exhaust stream does not have an appropriate concentration. Regeneration may be postponed from a normal threshold to a higher threshold in anticipation that a suitable exhaust stream will become available. Upon reaching the higher threshold, the operating map of the vehicle engine may be adjusted to generate a suitable exhaust stream or to further modify an exhaust stream which is almost at the desired concentration.

Once commenced, regeneration may continue until substantially complete, and combustion may be adjusted to ensure that regeneration continues notwithstanding a change of vehicle operating condition. However, in an embodiment of the invention regeneration may cease or may switch between active and forced passive regeneration should a corresponding change be made in vehicle operating condition.

For example an active regeneration commenced under highway driving conditions may be ceased if the vehicle adopts a town driving mode. In such circumstances significant post-injection of fuel would be required to maintain regeneration temperature in the DPF, but a control strategy may cease regeneration if the DPF has capacity to trap soot.

Likewise a forced passive regeneration adopted due to detection of an off-road operating condition may switch to active regeneration if the vehicle adopts a highway driving mode.

These changes of regeneration mode are determined by the amount of soot in the DPF (e.g. the percentage of capacity which has been used, or is available for use) and the operating condition of the vehicle.

The range of ceasing regeneration in one embodiment is 5-100% of maximum soot mass.

A single look-up table or algorithm may be provided to determine which regeneration strategy is commenced, and further to determine how a regeneration strategy may change as a vehicle moves between operating conditions.

In the alternative, a second look-up table or algorithm may determine conditions for changing or ceasing a regeneration strategy. Thus, for example, look-up tables may indicate commencement of regeneration, but not continuance thereof in the event of a change of vehicle operating condition. Similarly, look-up tables may not indicate commencement of regeneration, but the same vehicle operating parameters may indicate continuance of a regeneration event started under a different operating condition.

This aspect of the invention typically allows for relatively minor modification of combustion conditions to conclude a regeneration event in circumstances which would tend not to favour initiation of a regeneration event.

Conventional means may be used to determine the instant soot mass in a DPF, for example by calculation of soot production according to a substantially continuous assessment of vehicle fuelling and combustion, measurement of exhaust gas temperature at appropriate positions of an exhaust tract, and measurement of exhaust gas composition.

Within the scope of this application it is expressly intended that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF DRAWINGS

Embodiments of the invention will now be described, by way of example only, with reference to the accompanying drawings in which:

FIG. 3 is a matrix for use in the invention in ceasing regeneration.

DETAILED DESCRIPTION

Figures 1, 2:
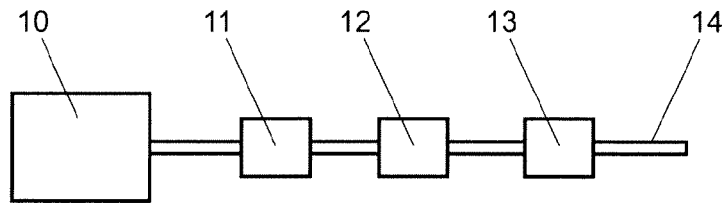
FIG. 1 illustrates schematically an exhaust tract of a diesel engine.
FIG. 2 is a matrix for use in an embodiment of the invention in initiating regeneration.

FIG. 1 illustrates typical exhaust treatment of diesel engine 10 comprising a diesel oxidation catalyst (DOC) 11, a diesel particle filter (DPF) 12, and selective catalytic reduction (SCR) 13. In use the DOC oxidizes hydrocarbons and carbon monoxide into carbon dioxide and water; the DPF traps small carbonaceous particles, and the SCR uses ammonia to treat $NO_x$, to the intent that exhaust gas emitted from the tailpipe 14 causes minimal undesirable pollution. The DOC and DPF generally act to produce an appropriate mix of $No_x$ for efficient functioning of the SCR.

FIG. 2 shows one example of a decision matrix by which an engine management unit (EMU) may determine the kind of regeneration to initiate in response to an operating condition of the vehicle.

In FIG. 2, regeneration conditions are given for successively increasing proportions of soot mass within a DPF. A percentage of 100% indicates a design threshold at which regeneration should occur or should have occurred according to an existing regeneration strategy. Within the invention it is however envisaged that a DPF will accommodate a greater soot loading, and accordingly percentages of up to 200% soot mass loading are given. Thus 200% soot mass loading is equivalent to the maximum soot mass permissible, in this example. Higher soot mass loading is acceptable in the invention because the regeneration rate is controlled through selection of an appropriate regeneration regime.

For the purposes of this illustration, 210% is indicative of a substantially blocked DPF, at which point the vehicle may generate a fault indication informing the vehicle driver to take the vehicle to an authorized repairer.

The second column indicates that regeneration is suppressed if temperature at the DPF inlet is below a threshold (Tmin) which is insufficient to support regeneration. Thus for example in the period after a cold engine start, regeneration will be inhibited, and it will be appreciated that in brief periods of town driving regeneration may never be initiated.

The third to sixth columns indicate four operating conditions of the vehicle, two on-road and two off-road for example.

The on-road conditions are town driving (e.g., less than 60 kph) and highway driving (e.g. more than 60 kph). Many factors other than vehicle speed may influence whether town or highway conditions are detected, for example vehicle load, but for simplicity of explanation a simple speed threshold is used.

Thus in town driving, exhaust temperature is unlikely to reach that necessary for active regeneration without substantial input of energy by, for example post-injection. For reasons given above significant post-injection is undesirable, and accordingly forced passive (P) regeneration is commanded for soot masses above 100%. Passive regeneration requires an exhaust stream with a high nitrogen dioxide flux, which is generally not desirable, and so in this example initiation of regeneration is inhibited at below 100% soot mass. It will be understood that minimum soot loading at which regeneration is initiated may be selected by a suitably skilled man according to the vehicle application and engine. Any additional $NO_x$ caused by forced passive regeneration will be removed by SCR.

The soot mass loading of the DPF may reach any level between empty and full dependent upon whether any regeneration has been initiated, or in circumstances where regeneration events are not completed. Thus in the example given repeated short journeys may not allow any regeneration event to be initiated if Tmin is not exceeded. Accordingly the DPF may become highly loaded before any initiation of regeneration during a different kind of driving event—such as highway driving.

The fourth column represents highway driving where the temperature of the exhaust gas stream is likely to be high. The DPF may reach a high soot mass if the majority of vehicle use is in town, and forced passive regeneration, even if repeated, may not prevent a progressive increase in soot mass. In this mode the exhaust gas stream is most suitable for active regeneration and requires typically only a small post-injection to initiate regeneration.

Accordingly active regeneration (A) can be initiated, and in the example given regeneration occurs for soot mass in the range 75-100%.

At higher soot mass loadings, regeneration may be inhibited in order to prevent high DPF temperatures where excess oxygen is present in the exhaust stream, for example when coasting at zero accelerator position (foot off). Alternatively passive regeneration may be acceptable because the maximum DPF temperature during passive regeneration is much less than during active regeneration. Accordingly, in the example of FIG. 2, passive regeneration is initiated at soot loadings of 125% and 150% for the highway driving condition.

The fifth column indicates an off road condition, where vehicle speed is less than or equal to a minimum ($V_{min}$), which may be 20 kph or less. Many inputs may be used to identify an off-road condition, such as selection of low transmission range or selection of increased ride height or selection of an off-road traction condition. The minimum speed $V_{min}$ may be dependent on the detected condition indicative of off-road, or in the combination of several such conditions.

In a slow speed off-road condition, the vehicle engine is more likely to be operating in a regime with a relatively high nitrogen dioxide content of the exhaust stream. This example thus provides for forced passive regeneration in the soot mass range 100-200%, it being recognized that the long periods of this off-road condition are unlikely, and accordingly regeneration at lower soot mass threshold may be inhibited in the expectation of a different operating condition more favourable to active regeneration.

In a higher speed off-road condition (column six), the engine may be assumed to be operating at higher load. Active regeneration is initiated at a soot mass of 75%. Regeneration at lower soot mass concentrations is inhibited, for example to postpone regeneration at a low soot mass concentration. At 125% soot mass, passive regeneration may be initiated since the exhaust temperature is assumed to be high. Above 125% passive regeneration is maintained to avoid the high DPF temperatures associated with active regeneration.

As noted above the initiation matrix of FIG. 2 is merely an example, and the quoted percentage soot mass loadings are illustrative. Regeneration may be determined according to any suitable reference, including look-up tables, an algorithm or a characteristic relating soot mass to another factor.

Soot mass can be determined by any known measure, including for example by measurement of the pressure drop across the DPF, or by summing in a register the theoretical production of soot according to a continuous monitoring of engine operation. Such methods may of course be used in combination according to established techniques, and may further take account of any reduction in soot mass as a result of a generation.

Conditions of use of a vehicle change continually, and since a full regeneration may take up to 30 minutes, it may not be appropriate to allow a regeneration event to continue until the soot mass loading is around 0%.

For example active regeneration in highway driving may require very little post injection of fuel. If however, during regeneration, the vehicle moves to the town driving condition, it is inappropriate to sustain active regeneration because a large post injection of fuel may be required to maintain temperature within the DPF.

Accordingly FIG. 3 shows a matrix of conditions applicable to a regeneration event which has been commenced according to, for example, the matrix of FIG. 2. Switching between conditions of the 'starting' matrix of FIG. 2 and the 'stopping' matrix of FIG. 3 may be automatic if a vehicle has a system of automatically sensing terrain type.

For example, FIG. 2 indicates that active regeneration should commence for highway driving at a minimum of 75% soot mass. FIG. 3 indicates that, once commenced, such active regeneration should continue as the soot mass reduces to 0%, on the assumption that highway driving is also continued.

In the event of a switch of vehicle operating condition to town driving, regeneration switches to a forced passive regime, and continues until soot mass approaches 0% under this condition of vehicle use.

In the event of a switch to off-road driving it will be noted from FIG. 3 that regeneration is ceased at a soot mass of 20% (whether active or forced passive) so as to minimize modification of engine fuelling in circumstances where adequate capacity is provided for soot retention, and an alternative driving condition may be anticipated which is better suited to regeneration.

The percentage soot mass figures of FIGS. 2 and 3 are merely examples, and it will be understood that a substantially continuous relationship may be provided for each operating condition, giving a regeneration strategy at the required precision. For example the look-up table could give a regeneration strategy at any desired percentage soot mass, and at any desired soot mass interval. Furthermore where discrete soot mass levels require a change in regeneration strategy for one operating condition, the same threshold may not apply to another operating condition.

The invention claimed is:

1. A method of determining in a vehicle whether to regenerate a diesel particle filter by active regeneration or by forced passive regeneration, the method comprising:
   determining a current soot mass of a diesel particle filter;
   determining an operating condition of the vehicle;
   determining whether the current soot mass of the diesel particle filter is in a first permissible regeneration range or in a second permissible regeneration range different from the first permissible regeneration range, the first permissible regeneration range and the second permissible regeneration range being based at least in part on the determined operating condition; and
   if the determined current soot mass is within the first permissible regeneration range, initiating active regeneration of the diesel particle filter; and
   if the determined current soot mass is within the second permissible regeneration range, initiating forced passive regeneration of the diesel particle filter.

2. A method according to claim 1, wherein both the first and second permissible regeneration ranges have lower limit values greater than 20% of maximum soot mass.

3. A method according to claim 1, wherein a lower limit value of the first and/or second permissible regeneration range is inversely related to vehicle speed.

4. A method according to claim 1, wherein the determined operating condition is one of a plurality of operating conditions that include on-road driving and off-road driving.

5. A method according to claim 4, wherein forced passive regeneration is initiated below one of a predetermined vehicle speed, a predetermined coolant temperature, a predetermined temperature of the exhaust gas aftertreatment system, a predetermined engine load and a predetermined wading depth.

6. A method according to claim 1, wherein active regeneration is initiated above a predetermined vehicle speed, a predetermined coolant temperature, a predetermined temperature of the exhaust gas aftertreatment system, a predetermined engine load and a predetermined wading depth.

7. A method according to claim 1, wherein the operating condition is determined by being selected by the vehicle driver.

8. A method according to claim 1, wherein the operating condition is determined automatically by a vehicle system.

9. A method according to claim 1, wherein regeneration is inhibited upon engine start until reaching a condition of one of engine temperature reaching a pre-determined minimum, continuous engine running exceeding a pre-determined time, and the exhaust gas aftertreatment system reaching a minimum temperature.

10. A method according to claim 1, where a relationship between soot mass and vehicle operating condition is provided for each operating condition.

11. A method according to claim 10, wherein each said relationship is defined by one of a look-up table and an algorithm.

12. A vehicle having a diesel particle filter and a processor configured to perform the method of claim 1.

13. A method according to claim 1, further comprising the step of determining one or more of the following vehicle conditions: a vehicle speed, an engine speed, a characteristic of the vehicle exhaust, a temperature of an engine, and a temperature of an exhaust system;
   wherein the step of determining whether the current soot mass of the diesel particle filter is in a first permissible regeneration range or in a second permissible regeneration range further comprises is based at least in part on the determined operating condition and the determined one or more vehicle conditions.

14. A method of determining in a vehicle whether to regenerate a diesel particle filter by active regeneration or by forced passive regeneration, the method comprising:
   determining a current soot mass of a diesel particle filter;
   determining that the vehicle is operating in a configuration adapted to on-road driving or off-road driving;
   determining whether the current soot mass of the diesel particle filter is in a first permissible regeneration range or in a second permissible regeneration range, different from the first permissible regeneration range, the first permissible regeneration range and the second permissible regeneration range being based, at least in part, on the determination that the vehicle is operating in a configuration adapted to on-road driving or off-road driving;
   if the determined current soot mass is within said first permissible regeneration range, initiating active regeneration of the diesel particle filter; and
   if the determined current soot mass is within said second permissible regeneration range, initiating forced passive regeneration of the diesel particle filter.

15. A method according to claim 1, wherein a lower limit value of the second permissible regeneration range is greater than a lower limit value of the first permissible regeneration range.

16. A method according to claim 1, wherein a lower limit value of the second permissible regeneration range is equal to an upper limit value of the first permissible regeneration range.

17. A method of determining in a vehicle whether to regenerate a diesel particle filter by active regeneration or by forced passive regeneration, the method comprising:
- determining a current soot mass of a diesel particle filter;
- determining that the vehicle is operating in a configuration adapted to on-road driving or off-road driving;
- determining whether the current soot mass of the diesel particle filter is in a permissible regeneration range, the permissible regeneration being based at least in part on the determination that the vehicle is operating in a configuration adapted to on-road driving or off-road driving; and
- if the determined current soot mass is within said permissible regeneration range, initiating one of active regeneration and forced passive regeneration of the diesel particle filter.

* * * * *